United States Patent

[11] 3,548,752

[72] Inventor Karl R. M. Karlstrom
    16840 Eleven Mile Road, Roseville, Mich. 48066
[21] Appl. No. 808,875
[22] Filed Mar. 20, 1969
[45] Patented Dec. 22, 1970
    Continuation-in-part of application Ser. No. 730,882, May 21, 1968, abandoned

[54] BRAKE FOR CONVEYOR TROLLEY
    10 Claims, 7 Drawing Figs.
[52] U.S. Cl. .................................................. 104/172, 188/53
[51] Int. Cl. .................................................. B65g 17/42, B61h 9/00
[50] Field of Search ....................................... 104/172, 178; 188/52, 33

[56] References Cited
    UNITED STATES PATENTS
    1,824,484  9/1931  Jackson ....................... 188/20
    3,397,650  8/1968  Kondur ....................... 104/172
    FOREIGN PATENTS
    966,003  8/1964  Great Britain ................ 104/172

Primary Examiner—Arthur L. La Point
Assistant Examiner—Robert Saifer
Attorney—Barnes, Kisselle, Raisch & Choate ABSTRACT: conveyor system comprising a track along which a plurality of carriers are movable. Each carrier includes a pusher dog that is movable into and out of position for engagement by a pusher lug of a conveyor chain. Each carrier is provided with wheels and a pivoted cam brake member which is normally urged by gravity in a direction to bring surfaces thereof into engagement with the wheels to frictionally engage the wheels. When the pusher dog is in position for engagement by the pusher lug of the conveyor, a pin on the pusher dog normally holds the cam brake member out of engagement with the wheels.

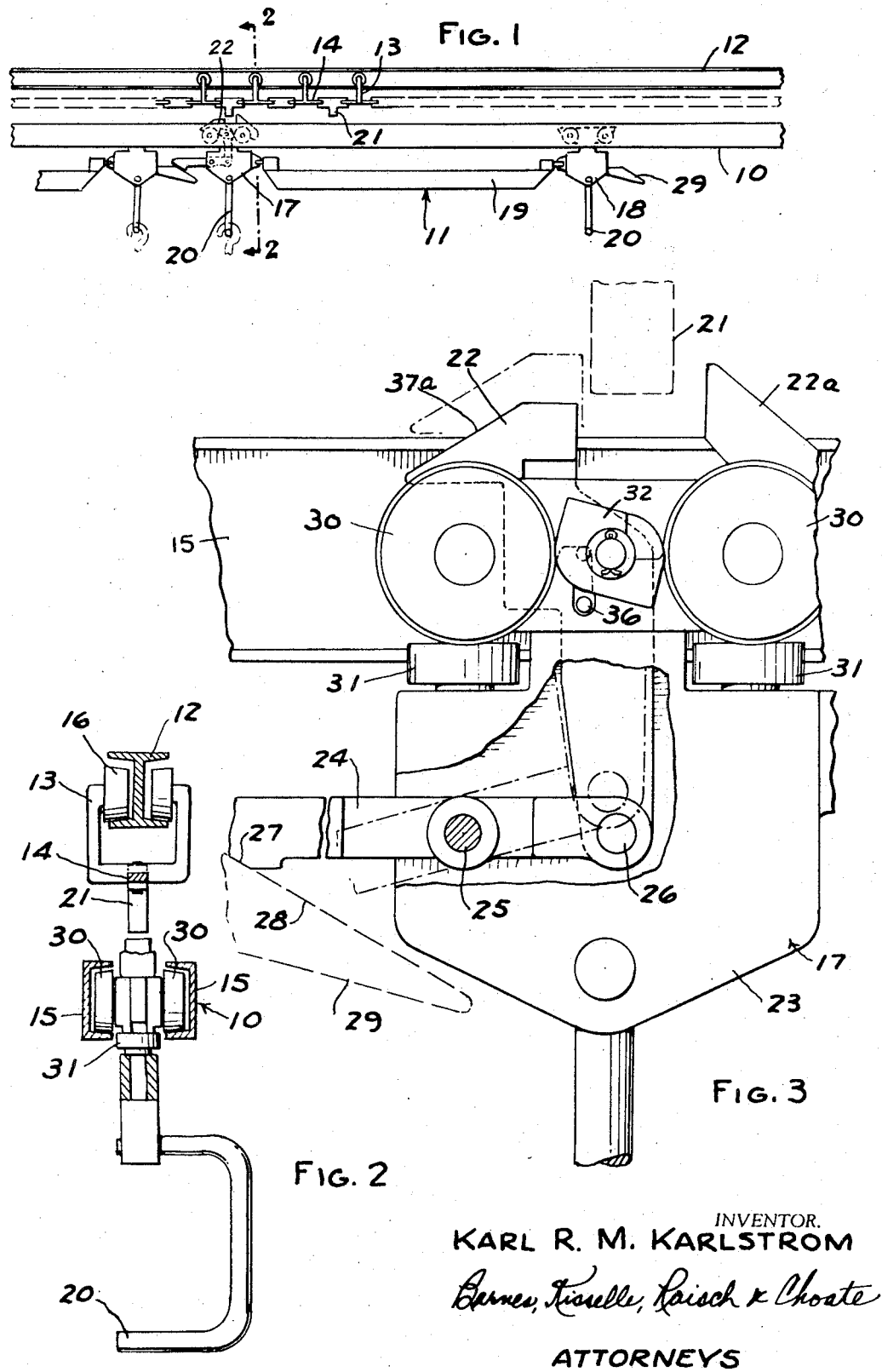

INVENTOR.
KARL R. M. KARLSTROM
BY
Barnes, Kisselle, Raisch & Choate
ATTORNEYS

BRAKE FOR CONVEYOR TROLLEY

This application is a continuation-in-part of application Ser. No. 730,882, filed May 1968, 1968, now abandoned.

This invention relates to conveyor systems and particularly to power and free conveyor systems.

In power and free conveyor systems, it is common to have a plurality of carriers that are movable along a track by engagement with a conveyor chain. In order to accommodate obstacles or accumulation of the carriers, it is common to have a movable pusher dog on each carrier which is movable into and out of position for engagement with a lug of a conveyor chain. When the pusher dog is moved out of engagement with the lug of the conveyor chain and the movement of the carrier is thus stopped on the track, it is desirable to provide a brake to prevent retrograde movement of the carrier along the track.

Among the objects of the invention are to provide a conveyor system which utilizes a simple, effective, economical brake system that is operable when the pusher dog is moved in a direction to disengage it from the lug of the conveyor chain.

In the drawings:

FIG. 1 is a partly diagrammatic side elevational view of a conveyor system embodying the invention.

FIG. 2 is a fragmentary sectional view on an enlarged scale taken along the line 2-2 in FIG. 1.

FIG. 3 is a fragmentary side elevational view on an enlarged scale of a portion of a carrier utilized in the system shown in FIG. 1, parts being broken away.

Figure 4:
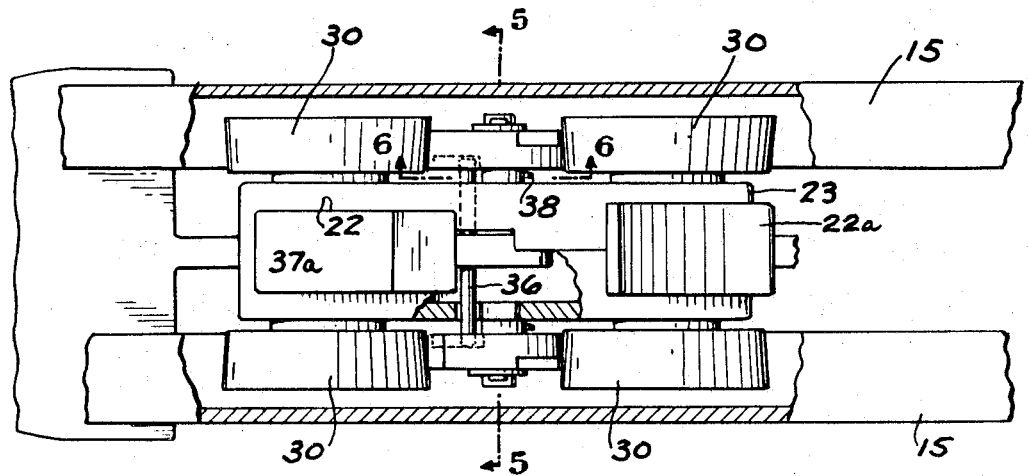
FIG. 4 is a part sectional plan view of the carrier shown in FIG. 3.

Referring to FIG. 1, a conveyor system comprises a track 10 along which a plurality of carriers 11 are moved. The system further includes a conveyor chain track 12 along which wheeled trolleys 13 are moved by a drive conveyor chain 14.

As shown in FIG. 2, the track 10 comprises inwardly facing channels 15 and the conveyor track 12 comprises an I-beam, the lower flange of which is engaged by the wheels 16 of the trolleys 13. Carrier 11 comprises a front trolley 17 and a rear trolley 18 interconnected by a pivoted tie bar 19. Each of the trolleys supports C-hooks 20 for carrying a load.

As shown in FIGS. 1 and 3, the conveyor chain 14 includes downwardly extending pusher lugs 21 which are adapted to engage a movable pusher dog 22 on the front trolley 17 of the carrier 11.

As shown in FIG. 3, pusher dog 22 is movable generally vertically within hollow body 23 of front trolley 17. A lever 24 is pivoted intermediate its ends at 25 on body 23 and to the lower end of pusher dog 22 as at 26. The lever 24 extends forwardly and includes an upwardly and forwardly extending surface 27 that is adapted to engage a corresponding surface 28 on a rearwardly extending member 29 on the rear trolley 18 of a preceding carrier. When lever 24 engages member 29, it is pivoted clockwise as viewed in FIG. 3 bringing it to the solid line position shown in FIG. 3 and thereby moving pusher 22 out of position for engagement by the pusher lugs 21. Thus, the movement of the carrier is interrupted along the track 10.

Figure 7:
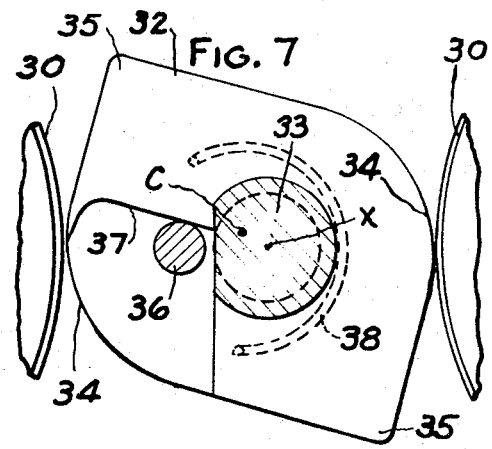
FIG. 7 is a fragmentary view similar to FIG. 6 on an enlarged scale.

As shown in FIG. 2, the body 23 supports longitudinally spaced pairs of wheels 30 that ride on the upper surface of the lower flanges of track members 15 and guide rollers 31 which are rotatable about vertical axes and are adapted to engage the edges of the lower flanges of channel members 15 (FIG. 2). A cam brake member 32 is pivoted on a pin 33 intermediate each pair of wheels 30 along each side of the carrier body 23. Cam brake member 32 is generally rectangular and has diametrically opposed surfaces 34 thereof cut away and curved to form braking surfaces while the opposite diametrically opposed corners 35 are intact. As shown in FIG. 7, the center X of the pin 33 is spaced from the center of gravity C of the member 32. This unbalances or counterweights the member 32 so that it tends to be yieldingly urged in counterclockwise direction as viewed in FIGS. 5 and 7 to bring the surfaces 34 into engagement with the wheels 30. By this arrangement, in the absence of some means for holding the brake member 32 out of contact with the wheels, the brake member 32 would contact the wheels providing a slight frictional drag when the trolley is moved in a forward direction and providing a brake preventing retrograde movement of the trolley in the rearward direction.

Figure 5:
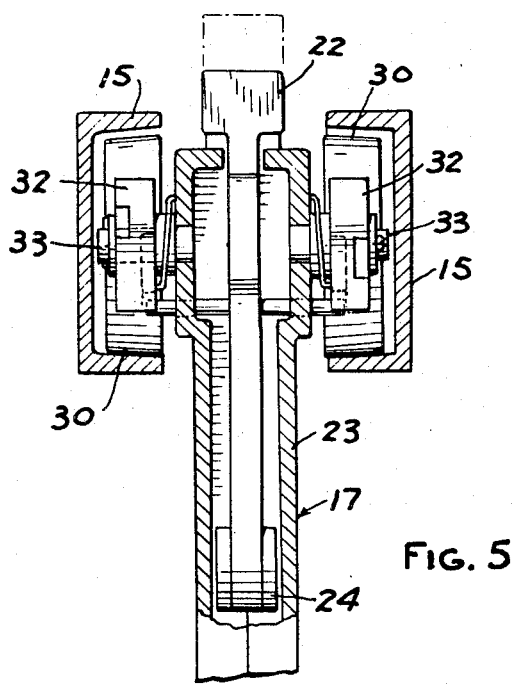
FIG. 5 is a fragmentary sectional view taken along the line 5-5 in FIG. 4.
Figure 6:
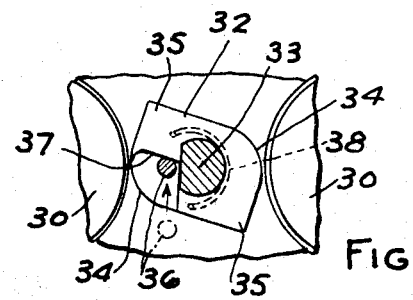
FIG. 6 is a fragmentary sectional view taken along the line 6-6 in FIG. 4, showing the parts in a different operative position.

However, when the pusher dog 22 is in its upper position as shown in broken lines in FIG. 3, a pin 36 extending horizontally on the pusher dog 22 has its ends extending upwardly into notches 37 in the cam brake members 32 holding the cam brake members in a position such that the surfaces 34 are out of contact with the wheels 30 (FIG. 5).

However, when the lever 24 engages the preceding carrier or when a stop member engages a cam surface 37a on the pusher 22, the pusher dog 22 is moved downwardly moving the pin 36 out of engagement with the notches 37 of each of the cam brake members 32 permitting them to pivot and thereby bringing their surfaces 34 into engagement with the wheels to prevent any rearward movement of the carrier.

In order to insure that the cam brake members 32 will move into engagement with the wheels, even in the presence of dirt and grease, a torsion spring 38 is provided on the pin 33 and has one end thereof engaging the body 23 of the trolley and the other end thereof engaging its respective cam brake member 32 yieldingly urging it in a direction tending to bring the surfaces 34 into engagement with the wheels.

In accordance with conventional construction, the trolley 17 is provided with a pivoted and counterweighted holdback dog 22a.

I claim:

1. In a conveyor system, the combination comprising:
   a track;
   at least one carrier movable along said track;
   said carrier having at least one pair of wheels thereon;
   a conveyor for driving said carrier along said track;
   means on said carrier movable into and out of engagement with said conveyor;
   a brake member movably mounted on said carrier and normally yieldingly urged in a direction for engagement with said wheels;
   means operable when said conveyor engaging means is in engagement with said conveyor to maintain said brake member out of engagement with said wheels;
   said last-mentioned means being responsive to movement of said conveyor engaging means out of engagement with said conveyor to permit said brake member to engage said wheels;
   said brake member comprising a cam pivotally mounted between said wheels and having surfaces thereon adapted to engage said wheels;
   said cam brake member being generally rectangular and having diametrically opposed portions thereof curved to form said wheel contacting surfaces; and
   the center of said brake member being spaced from the center of gravity of the pivot thereof to unbalance said member yieldingly urging said cam member toward said wheels.

2. The combination set forth in claim 1 including spring means supplementing the action of gravity yieldingly urging said brake member into engagement with said wheels.

3. In a conveyor system, the combination comprising:
   an overhead track;
   at least one carrier including a trolley movable along said track;
   said trolley having wheels thereon;
   a conveyor for driving said carrier along said track;
   a pusher dog on said trolley movable into and out of position for engagement with a lug on said conveyor;

a brake member movably mounted on said trolley and normally yieldingly urged in a direction for engagement with said wheels;

interengaging means between said pusher dog and said brake member operable when said pusher dog is in engagement with a lug on said conveyor to maintain said brake member out of engagement with said wheels;

said last-mentioned means being responsive to movement of said pusher dog out of engagement with a lug on said conveyor to permit said brake member to engage said wheels;

said brake member comprising a cam pivotally mounted between said wheels and having surfaces thereon adapted to engage said wheels;

said cam member being generally rectangular and having diametrically opposed portions thereof curved to form said wheel contacting surfaces; and the center of gravity of said brake member being spaced from the center of gravity of the pivot thereof to define a counterweight yieldingly urging said cam member toward said wheels.

4. The combination set forth in claim 3 including spring means supplementing the action of gravity yieldingly urging said brake member into engagement with said wheels.

5. For use in a conveyor system:

a trolley comprising a body;

said trolley having wheels thereon for engagement with a track;

a pusher dog on said trolley movable into and out of position for engagement with a lug of a conveyor;

a brake member movably mounted on said body and normally yieldingly urged in a direction for engagement with said wheels;

interengaging means between said pusher dog and said brake member operable when said pusher dog is in engagement with a lug of a conveyor to maintain said brake member out of engagement with said wheels;

said last-mentioned means being responsive to movement of said pusher dog out of engagement with a lug on a conveyor to permit said brake member to engage said wheels;

said brake member comprising a cam pivotally mounted between said wheels and having surfaces thereon adapted to engage said wheels;

said cam member being generally rectangular and having diametrically opposed portions thereof curved to form said wheel contacting surfaces; and the center of gravity of said brake member being spaced from the center of gravity of the pivot thereof to define a counterweight yieldingly urging said cam member toward said wheels.

6. The combination set forth in claim 5 including spring means supplementing the action of gravity yieldingly urging said brake member into engagement with said wheels.

7. In a conveyor system, the combination comprising:

a track;

at least one carrier movable along said track;

said carrier having wheels thereon;

a conveyor for driving said carrier along said track;

means on said carrier movable into and out of engagement with said conveyor;

a brake member movably mounted on said carrier;

said brake member being operable to permit movement of the carrier in a forward direction and prevent retrograde movement of the carrier in a rearward direction;

said brake member comprising a cam pivotally mounted on said carrier and having a surface movable into engagement with said wheels;

said cam brake member being adapted to contact a pair of wheels and being generally rectangular and having diametrically opposed portions thereof curved to form said wheel contacting surfaces; and the opposite diametrically opposed corners extending radially outwardly from said pivot point to unbalance said member yieldingly urging said cam member toward said wheels.

8. The combination set forth in claim 7 including spring means supplementing the action of gravity yieldingly urging said brake member into engagement with said wheels.

9. For use in a conveyor system:

a trolley comprising a body;

said trolley having wheels thereon for engagement with a track;

a pusher dog on said trolley movable into and out of position for engagement with a lug of a conveyor;

a brake member movably mounted on said body;

said brake member being operable to permit forward movement of the trolley and being operable to prevent retrograde movement of the trolley;

said brake member comprising a cam pivotally mounted on said carrier and having a surface movable into engagement with said wheels;

said cam member being adapted to contact a pair of wheels and being generally rectangular and having diametrically opposed portions thereof curved to form said wheel contacting surfaces; and the center of gravity of said brake member being spaced from the center of gravity of the pivot thereof to define a counterweight yieldingly urging said cam member toward said wheels.

10. The combination set forth in claim 9 including spring means supplementing the action of gravity yieldingly urging said brake member into engagement with said wheels.